(12) United States Patent
Goldfain et al.

(10) Patent No.: US 10,296,003 B2
(45) Date of Patent: May 21, 2019

(54) AUTONOMOUS VEHICLE RESEARCH SYSTEM

(71) Applicants: Brian Goldfain, Atlanta, GA (US); Paul Drews, Atlanta, GA (US); James Rehg, Atlanta, GA (US); Evangelos Theodorou, Atlanta, GA (US); Panagiotis Tsiotras, Atlanta, GA (US); Grady Williams, Atlanta, GA (US)

(72) Inventors: Brian Goldfain, Atlanta, GA (US); Paul Drews, Atlanta, GA (US); James Rehg, Atlanta, GA (US); Evangelos Theodorou, Atlanta, GA (US); Panagiotis Tsiotras, Atlanta, GA (US); Grady Williams, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 258 days.

(21) Appl. No.: 15/593,460

(22) Filed: May 12, 2017

(65) Prior Publication Data

US 2018/0364711 A1 Dec. 20, 2018

Related U.S. Application Data

(60) Provisional application No. 62/335,121, filed on May 12, 2016.

(51) Int. Cl.
*G01C 22/00* (2006.01)
*G05D 1/00* (2006.01)
(Continued)

(52) U.S. Cl.
CPC ....... *G05D 1/0088* (2013.01); *F02N 11/0807* (2013.01); *G05D 1/0011* (2013.01);
(Continued)

(58) Field of Classification Search
CPC .. G05D 1/0088; G05D 1/0011; F02N 11/0807
See application file for complete search history.

(56) References Cited

U.S. PATENT DOCUMENTS 6,909,708 B1 *  6/2005  Krishnaswamy ... H04L 12/1813
                                                          370/352
7,242,574 B2    7/2007  Sullivan
(Continued)

*Primary Examiner* — Adam M Alharbi
(74) *Attorney, Agent, or Firm* — Bryan W. Bockhop; Bockhop Intellectual Property Law, LLC

(57) ABSTRACT

An autonomous vehicle research system includes a vehicle having an attached frame and an engine. A sensing, control and data logging unit, mounted on the frame and in control communication with the engine senses vehicle operational parameters, controls the engine and to steering, and transmits operational data and log operational data. An operator control unit in communication with the sensing, control and data logging unit receives operational data from the sensing, control and data logging unit and presents visual real time display of the operational data. The operator control unit includes a manual cut-off switch that causes the engine to cease moving the vehicle. A remote control unit is manually switchable between a remote control mode and an autonomous control mode. In the remote control mode, the user controls the vehicle remotely. In the autonomous mode, the sensing, control and data logging unit controls the vehicle autonomously.

20 Claims, 1 Drawing Sheet

(51) Int. Cl.
*G07C 5/08* (2006.01)
*F02N 11/08* (2006.01)
*G07C 5/00* (2006.01)

(52) U.S. Cl.
CPC ........... *G05D 1/0061* (2013.01); *G07C 5/008* (2013.01); *G07C 5/085* (2013.01); *G05D 2201/0213* (2013.01)

(56) References Cited

U.S. PATENT DOCUMENTS

| | | |
|---|---|---|
| 8,126,642 B2 | 2/2012 | Trepagnier et al. |
| 8,280,623 B2 | 10/2012 | Trepagnier et al. |
| 8,412,449 B2 | 4/2013 | Trepagnier et al. |
| 8,446,884 B2 * | 5/2013 | Petite .................... H04B 1/406 370/335 |
| 8,706,394 B2 | 4/2014 | Trepagnier et al. |
| 9,018,904 B2 | 4/2015 | Seyerle |
| 9,201,421 B1 | 10/2015 | Fairfield et al. |
| 9,361,011 B1 * | 6/2016 | Burns .................... G06F 16/71 |
| 2006/0271251 A1 | 11/2006 | Hopkins |
| 2010/0106344 A1 | 4/2010 | Edwards et al. |
| 2015/0355641 A1 | 12/2015 | Choi et al. |

* cited by examiner

AUTONOMOUS VEHICLE RESEARCH SYSTEM

CROSS-REFERENCE TO RELATED APPLICATION(S)

This application claims the benefit of U.S. Provisional Patent Application Ser. No. 62/355,121, filed May 12, 2016, the entirety of which is hereby incorporated herein by reference.

STATEMENT OF GOVERNMENT INTEREST

This invention was made with government support under agreement No. W911NF-11-1-0046, awarded by the Department of the Army and agreement No. W911NF-12-1-0377, awarded by the Department of the Army. The government has certain rights in the invention.

BACKGROUND OF THE INVENTION

1. Field of the Invention

The present invention relates to autonomous vehicles and, more specifically, to a platform for conducting autonomous vehicle research.

2. Description of the Related Art

Autonomous driving has become an important area of research in the development of robotic vehicles. A robotic vehicle typically includes a suite of sensors and an on-board computer system that evaluates the current state of the vehicle and that generates signals that control the vehicle based on the desired state of the vehicle in view of its current state.

Full autonomy remains an open problem despite significant advancements from universities, car manufacturers, and technology companies. Full autonomy, known as level 5 in the Society of Automotive Engineers Levels of Driving Automation, is defined as the full time performance by an automated driving system of all aspects of the dynamic driving task under all roadway and environmental conditions that can be managed by a human driver. Level 5 autonomous vehicles on public roads could help eliminate more than 90 percent of the 35,000 annual traffic fatalities caused by human error in the US, free up commute time for other activities, reduce road congestion and pollution, and increase driving resource utilization. A largely unexplored regime that level 5 vehicles must master is operating under abnormal and extreme driving conditions. This includes unstructured environments such as off road, at high speed, and over loose surfaces where severe understeer, oversteer, skidding, and contact lose with the road surface is common. Additionally, dynamic, unpredictable environments such as close proximity to moving vehicles, pedestrians, and other obstacles require short time scales for perception, planning, and control.

Major barriers to studying abnormal and extreme driving on full scale vehicles are cost and safety. Large investments, often up to $1 million per vehicle, are required for vehicle development, testing and maintenance infrastructure and personnel, and safety precautions before any data can be collected. Only very large companies can afford a fleet of autonomous test vehicles, and none test at the limits of performance where damage to the vehicle or injuries to the operator could happen. When working with full size vehicles, interfering with factory installed sensors and actuators poses another challenge, while, even for a trial run, a closed track is necessary unless special precautions are taken and registration is obtained in one of the few states that have enacted autonomous vehicle legislation.

Computer simulations offer an alternate testing method to full scale vehicles. They have improved significantly in recent years, and generate almost unlimited driving miles, but they will never fully replicate the interactions of a complex system, like an autonomous vehicle, with the real world. For autonomous vehicles to be safe, the failures and unforeseen circumstances encountered during real world testing that are impossible to devise in simulation must be overcome. Development and evaluation of new autonomous driving technologies cannot be based solely on simulations, which may fail to capture critical aspects of the real world.

Scaled vehicles ranging in size from 1:10 to 1:5 the size of a vehicle, often based on radio controlled (RC) vehicles, are much easier and less expensive to work with. However, 1:10 scale platforms exhibit significantly different dynamics than full sized vehicles and cannot carry adequate sensing and on board computation for state of the art algorithms. Operating 1:5 scale vehicles can bridge the gap between inaccurate software simulations and costly full scale real vehicle experiments. Despite recent progress and many publications detailing scaled autonomous testbeds, results lack reproducibility because of the one off nature of these testbeds, private datasets, and inconsistent testing methods.

Scaled platforms built from modified RC cars are popular in the academic and hobby communities. These platforms are typically 1 to 3 feet long and weigh between 5 and 50 pounds. Cost are orders of magnitude lower than full sized vehicles, and construction, maintenance, and programming can be done by a small number of non-professionals instead of a team of engineers. The safety concerns of full sized vehicles are lessened even for extreme driving scenarios.

Despite the accessibility of scaled platforms, most cannot carry an adequate sensor and computing payload for state of the art algorithms. Often no public documentation exists for construction, configuration, and operation so results are not reproducible. Most systems are purpose built for one experiment and not robust enough to survive repeatedly pushing the vehicle to the mechanical and software limits of the system where crashes are inevitable. Scaled platforms show great promise, but previous attempts fall short in design and performance.

Therefore, there is a need for a robust autonomous research vehicle that can be controlled both remotely and autonomously and that can be used repeatedly in different experiments.

SUMMARY OF THE INVENTION

The disadvantages of the prior art are overcome by the present invention which, in one aspect, is an autonomous vehicle research system that includes a vehicle. The vehicle includes a frame and an engine attached thereto. A sensing, control and data logging unit is mounted on the frame and is in control communication with the engine. The sensing, control and data logging unit is configured to: sense vehicle operational parameters, to control the engine and to steer the vehicle, to transmit operational data wirelessly and log operational data. An operator control unit is spaced apart from the vehicle and is in wireless communication with the sensing, control and data logging unit. The operator control unit is configured to receive operational data from the sensing, control and data logging unit and to present a visual real time display of the operational data. The operator control unit includes a first manual cut-off switch that, when activated, causes the engine to cease moving the vehicle. A remote control unit is spaced apart from the operator control unit and from the vehicle. The remote control unit is in wireless communication with the sensing, control and data logging unit. The remote control is manually switchable between a remote control mode and an autonomous control mode so that when a user selects the remote control mode, the user controls the vehicle remotely, and when the user selects the autonomous mode, the sensing, control and data logging unit controls the vehicle autonomously.

In another aspect, the invention is an autorally research vehicle system that includes a vehicle having a frame and an engine attached thereto. A sensing, control and data logging unit is mounted on the frame and in control communication with the engine. The sensing, control and data logging unit is configured to: sense vehicle operational parameters, to control the engine and to steer the vehicle, to transmit operational data wirelessly and log operational data. An operator control unit is spaced apart from the vehicle and is in wireless communication with the sensing, control and data logging unit. The operator control unit is configured to receive operational data from the sensing, control and data logging unit and to present a visual real time display of the operational data. The operator control unit includes a first manual cut-off switch that, when activated, causes the engine to cease moving the vehicle. A remote control unit is spaced apart from the operator control unit and from the vehicle. The remote control unit is in wireless communication with the sensing, control and data logging unit. The remote control is manually switchable between a remote control mode and an autonomous control mode so that when a user selects the remote control mode, the user controls the vehicle remotely, and when the user selects the autonomous mode, the sensing, control and data logging unit controls the vehicle autonomously. The remote control unit includes: a throttle control input; a steering input; a brake control input; and a second manual cut-off switch that, when activated, causes the engine to cease moving the vehicle. A plurality of wheels is operatively coupled to the frame and that are driven by the engine. A steering actuator, responsive to the sensing, control and data logging unit, causes two of the wheels to turn in response to control commands. A protective enclosure protects the sensing, control and data logging unit from failure as a result of vehicle impact. The protective enclosure includes: an exterior housing that envelops as least a portion of the sensing, control and data logging unit and that resists deformation when subjected to no more than a predetermined force; and a plurality of mounts that physically couple the exterior housing to the frame and that are configured to fail when the exterior housing is subjected to a force that is greater than the predetermined force.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
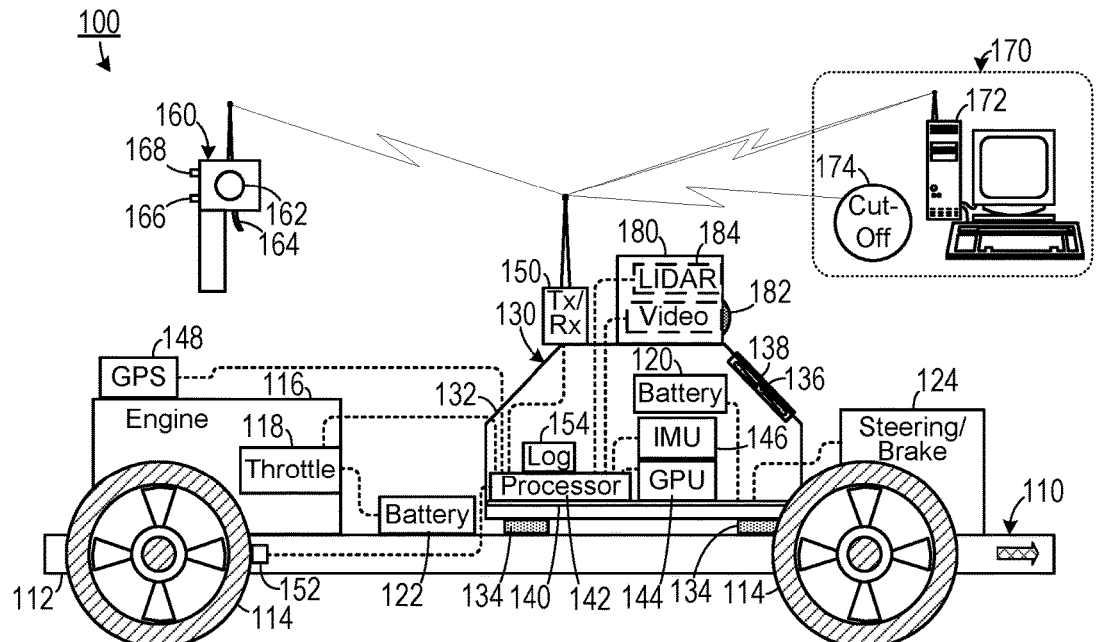
FIG. 1 is a schematic diagram of one embodiment of an autonomous vehicle research system.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "engine" includes a machine with moving parts that converts power into motion.

As shown in FIG. 1, one embodiment of an autonomous vehicle research system 100 includes a vehicle 110 (which can be a land vehicle, a water vehicle or a flying vehicle) that includes a frame 112 and an engine 116 (which could be, for example, an electric motor or an internal combustion engine). If the engine 116 is an electric motor, it can be powered by a battery 122 and can be controlled by an electrical throttle 118. A set of wheels 114 can be operational coupled to the frame 112, which can be manipulated by a steering and braking unit 124, which includes a steering actuator and a braking actuator. (While the figure shows steering and braking being actuated by one unit, in many embodiments there will be a steering actuator that is separable form a braking actuator.)

A sensing, control and data logging unit 130 is mounted on the frame 112 and controls the engine 116 and the steering and braking unit 124. The sensing, control and data logging unit 130 also senses vehicle operational parameters. The sensing, control and data logging unit 130 includes at least one vehicle state sensor that generates a vehicle state signal, which indicates, for example, the position, orientation and speed of the vehicle 110. Examples of the vehicle state sensors employed can include: a stereo visual camera pair 182; a global positioning sensor 148; an inertial measurement unit sensor 146; a light detection and ranging (LIDAR) sensor 184, and a wheel-mounted Hall effect wheel speed sensor 152. Other sensors that can be employed can include, for example a RADAR sensor and an ultrasound sensor. The sensing, control and data logging unit 130 can be powered by a battery 120.

A processor 142, which is mounted on a mother board 140, receives the vehicle state signals and generates control signals that control speed and direction of the vehicle based on the state signal and input from a remote control unit 160, if the vehicle 110 is being operated in a remote control mode. A data logging hard drive 154 stores operational data received from the processor for post-experimental analysis. A wireless transceiver 150 is in communication with the processor 142 and can receive a wireless control signal form the remote control unit 160. The wireless transceiver 150 generates a wireless operational data signal to the operator control unit 170 for real time analysis. (While a single transceiver 150 is shown for simplicity, some embodiments will employ two separate transceivers: one for communicating with the remote control unit 160 and the other for communicating with the operator control unit 170.) The processor 142 may be computationally augmented with a highly parallel processing unit, such as a graphics processing unit 144 to solve complex control equations in real time.

The processor 142 is programmed to detect unusual events (such as low battery level; loss of global positioning system signal; sensor failure; and loss of remote control signal) and to cause the engine 116 to cease moving the vehicle upon detection of an unusual event. This can be done by opening a relay connecting the throttle 118 to the battery 122.

An operator control unit 170 is in wireless communication with the sensing, control and data logging unit 130 and receives operational data therefrom. The operator control unit 170 includes a computer 172 (e.g., a lap top computer) for presenting a visual real time display of the operational data. A first manual cut-off switch 174 can be used to cause the engine 116 to cease moving the vehicle 110 when an operator deems it useful to stop the vehicle 110 either for safety or research purposes.

A remote control unit 160 is in wireless communication with the sensing, control and data logging unit 130 and allows a user to control the speed and direction of the vehicle 110. The remote control unit 160 can include: a throttle control input 164, for controlling vehicle speed; a steering input 162, for controlling vehicle direction; a remote/autonomous control input 168 that either takes control by the remote control unit 160 or allows the vehicle 110 to operate autonomously; and a second manual cut-off switch 166 that, when activated, causes the engine 116 to cease moving the vehicle 110. The remote control unit 160 is manually switchable between a remote control mode and an autonomous control mode so that when a user selects the remote control mode, the user controls the vehicle 110 remotely, and when the user selects the autonomous mode, the sensing, control and data logging unit 130 controls the vehicle 110 autonomously.

A protective enclosure can be used to protect the sensing, control and data logging unit 130 from failure as a result of vehicle impact. The protective enclosure can includes an exterior housing 132 that envelops as least a portion of the sensing, control and data logging unit 130 so as to resist deformation when subjected to no more than a predetermined force (e.g. a 10 G force). The exterior housing 132 can be made of a preferable conductive material (such as aluminum or carbon fiber composite) to provide both strength and shielding of the electronic components housed therein from electromagnetic interference. A plurality of mounts 134 physically couples the exterior housing 132 to the frame 112. The mounts 134 are configured to break away when the exterior housing 132 is subjected to a force that is greater than the predetermined force. For example, if the predetermined force is a 10 G force, then the plurality of mounts 134 can break away at a force of 8 G. As a result, the sensing, control and data logging unit 130 breaks away before the exterior housing 132 fails, thereby preserving the electronics contained therein. The exterior housing 132 defines at least one ventilation opening therethrough to which is applied a cooling fan 136 for drawing air through the ventilation opening. A conductive mesh 138 is placed across the ventilation opening and is electrically coupled to the exterior housing 132 to maintain electromagnetic shielding.

Figure 2:
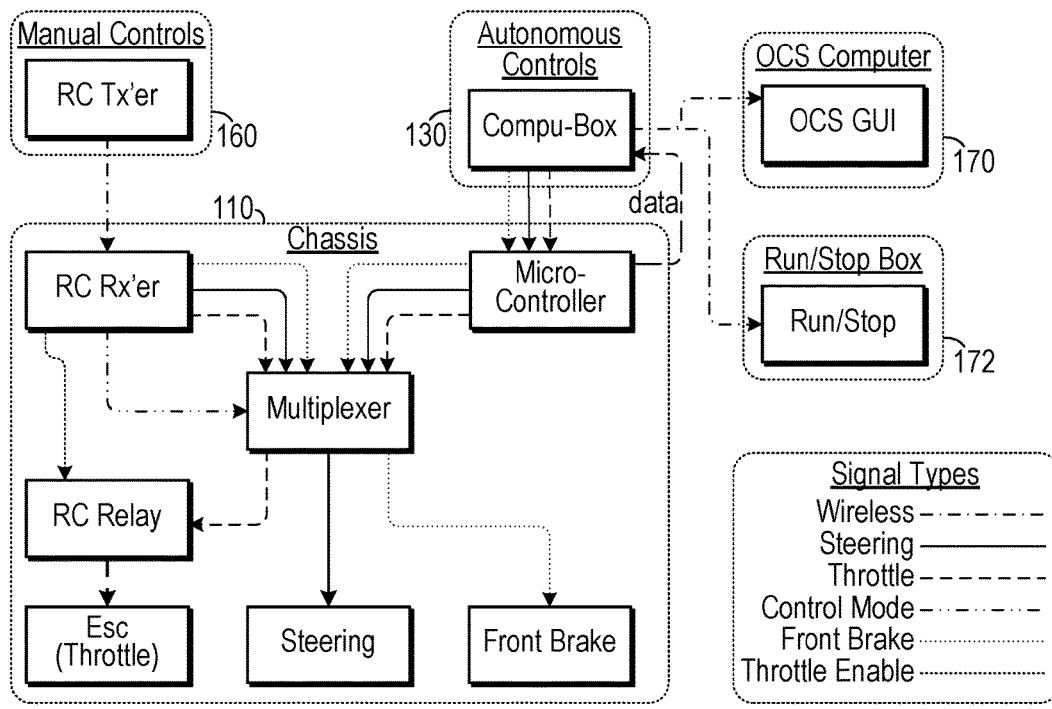
FIG. 2 is a block diagram showing electronic components employed in an autonomous vehicle research system.

The signal connections between the elements are shown in more detail in FIG. 2.

In one experimental embodiment, the vehicle is based on a 1:5 scale RC truck and is approximately 1 m long, 0.6 m wide, 0.4 m high, weighs almost 22 kg, and has a top speed of 90 kph. The platform is capable of autonomous driving using only onboard sensing, computing, and power. While larger than many other scaled autonomous ground vehicles, the platform offers a cost effective, robust, high performance, and safe alternative to operating full sized autonomous vehicles while retaining realistic vehicle dynamics and a large payload capacity. The capabilities offer a large performance improvement over traditional scaled autonomous vehicles. The two primary components of the platform, the chassis and compute box, are described in the remainder of this section.

The chassis is designed as a self-contained system that can easily interface to a wide variety of computing and sensing packages. Like a standard RC car, the chassis can be driven manually using the included transmitter. For computer control, the USB cable from the electronics box must be attached to an onboard computer running the interface software. The computer receives wheel speed data, electronic speed controller (ESC) diagnostic information, and the manually provided actuator commands read from the RC receiver over the USB cable.

In this experimental embodiment, the chassis is based on a HPI Baja 5SC RC trophy truck. The total weight of the assembled chassis is 13 kg. The major upgrades from the stock chassis are the electric conversion, front brake installation, and electronics box replacement. The electric conversion replaces the stock 3 hp, 26 cc two-stroke gasoline engine with the 10 hp peak output electric motor and ESC (available from Castle Creations). Compared to the stock engine, the electric motor is much more powerful, more responsive, more reliable, provides an integrated electronic rear brake, generates less heat and no exhaust residue, and requires minimal maintenance. The motor and chassis electronics are powered by two 4-cell 14.8 V 6500 mAh Lithium Polymer (LiPo) batteries connected in series. A full charge lasts between 15 and 90 minutes depending on usage. Font hydraulic brakes are actuated by a brake servo. Parts of the chassis structure were upgraded to handle the increased weight of the sensor and computing package. The stock plastic steering linkage was replaced with billet aluminum parts to withstand the increased steering torque of the upgraded steering servo and weight on the linkage. The plastic side rail guards used as mount points for the compute box were replaced with billet aluminum parts to carry the weight of the compute box without deflecting. Axle extenders were installed to increase the track of the vehicle by 3.8 cm to improve lateral stability and make room to mount the front brakes and the wheel rotation sensors.

The stock suspension springs were replaced with stiffer springs of similar dimensions to reduce body roll and improve driving dynamics. The full robotic platform in this experimental embodiment weighs 58% more than the stock chassis, so the spring constants were increased by roughly the same percentage. Custom springs can be expensive, so off-the-shelf springs were sourced as close to the desired dimensions and rates as possible. The front spring constant increased from 8.48 lb/in to 15 lb/in and the rear spring constant from 11.17 lb/in to 19.09 lb/in. The shock oil viscosity was also increased roughly 58% from 500 cSt to 850 cSt to properly damp the upgraded springs.

The stock two channel transmitter was replaced with a programmable four channel transmitter as part of the electronics box upgrade. The first two channels control the steering and throttle, respectively, and the remaining channels are used in the vehicle safety system discussed in Safety System.

To sense wheel speeds, a Hall effect sensor and magnets arranged in a circular pattern to trigger the sensor are installed on each wheel hub. The chosen sensor is a Hallogic OH090U unipolar switch and the magnets are N52 grade 0.3175 cm diameter, 0.1588 cm thick magnets. The magnet can trigger the sensor from up to 0.58 cm away. Larger magnets could be used to increase the maximum tripping distance but the chosen setup works reliably and fits easily in the wheel hub assemblies. Hardware timers in the Arduino Due in the electronics box are used to accurately measure the time between magnets. Inter-magnet timing information is translated to rotation rates and sent to the compute box at 70 Hz.

Inside the electronics box, the RC signals from the receiver are read by the Arduino Due at 50 Hz and sent to the compute box so that, even under manual control, the control signals sent to the actuators can be recorded. This is especially useful for collecting training data where human control signals are required. The Due also receives diagnostic information from the ESC that is forwarded to the compute box.

A Hemisphere P307 GPS receiver provides absolute position at 20 Hz, accurate to approximately 2 cm under ideal conditions with real time kinematic (RTK) corrections from a GPS base station. The antenna is mounted on top of a ground plane at the back of the chassis along with the receiver. The location positions the antenna the maximum distance from the compute box to reduce interference and maximize the view of the sky while still protected during rollovers. The ground plane is an acrylic sheet coated with copper conductive tape and is designed to break before the GPS antenna or sensitive GPS board in the event of a severe crash.

The chassis employs one servo to operate the steering linkage and one to actuate the master cylinder for the front brakes. Both servos use the 7.4V digital hobby servo standard which offers more precise, higher torque output, faster response time, and a reduced dead band compared to traditional 6.0V analog servos. All control signals, for both servos and the ESC, are standard 50 Hz hobby pulse width modulation (PWM) signals with a duty cycle from 1 ms to 2 ms, with a neutral value of 1.5 ms. The servos do not have position feedback.

Custom 3D printed ABS plastic parts installed in a the chassis support the electronics box, GPS box, mounts for the back wheel rotation sensors and magnets, and alignment guides for the front brake disks. ABS plastic is an easy and lightweight medium for quickly manufacturing complex geometries for components that do not experience significant loading. The electronics box replaces the stock one mounted in the front of the chassis superstructure, just behind the steering servo and linkage. Contained within the box are the radio receiver, Arduino Due, servo multiplexer, run/stop relay, communication board for the ESC, and servo glitch capacitor. The GPS box contains the GPS board, Cui a 3.3 V, 10 W isolated power supply, a small fan, and the GPS antenna mounted to the ground plane, which is the lid. Front brake disk aligners and mounts for the rear wheel rotation sensors and magnets are installed on the chassis. The front brake disk aligners are needed to keep the disks rotating smoothly because the front wheel rotation sensor magnets unbalance the disks if left to freely rotate.

Modern control and perception algorithms are CPU- and GPU-intensive. To maximize performance and reduce hardware development and software optimization time, the compute box employs standard components instead of specialized embedded hardware typical of scaled autonomous platforms. The compute box design provides a robust enclosure that mounts to the chassis and fits inside the stock protective body. The weight of the empty compute box is 3.3 kg, and 8.8 kg with all components installed.

The enclosure is designed to withstand a 10 g direct impact from any angle without damaging internal electronic components and fabricated out of 2.286 mm thick 3003 aluminum sheet. The 10 g impact is larger than impacts experienced at a typical test site, including as a result of collisions with fixed objects and rollovers. The 3003 alloy of aluminum was chosen for its strength, ductility, and relatively light weight. The sides of the box are tungsten inert gas (TIG) welded to the bottom to accurately join the large panels of relatively thick aluminum sheet without leaving gaps. Aluminum dust filters coupled with a foam membrane allow continuous airflow through the box while keeping out environmental contaminants such as dust and rocks. Combined with the all-aluminum exterior, the assembled compute box provides excellent electromagnetic interference (EMI) containment.

The cameras and lenses are mounted facing forward on the top of the box on an aluminum plate for rigidity and are protected by covers made from structural fiberglass that does not affect the signal quality for the antennas mounted on the top of the box. Each camera cover is secured to the compute box with four clevis and cotter pins for quick access to the lens and cameras as needed.

Four 3D printed components are inside the compute box: a battery holder, a SSD holder, a GPU holder, and a RAM holder. The battery holder tightly secures the compute box battery and power supply. The battery slot is slightly undersized and lined with foam so that the battery press fits into the mount and can be removed for charging and maintenance without removing any internal screws. The SSD holder is used to securely mount a 2.5 inch SSD to the side wall of the compute box. The GPU holder fits over the GPU and secures it to the main internal strut while still allowing adequate airflow.

The compute box attaches to the chassis with four 3D printed mounts attached to the bottom of the compute box. The mounts fit over vertical posts on the chassis rail guards and are secured to the chassis with a cotter pin though the mount and post. Special consideration was taken to design the mounts as break away points for the compute box in the event of a catastrophic crash. The mounts are easy and inexpensive to replace and break away before any of the aluminum compute box parts fail to protect the electronics within the compute box. By applying lateral forces with FEA and the CAD models, the failure point of the mounts is designed to be at 8 g of force on the compute box compared to the 10 g design load for the rest of the compute box. In practice, the compute box mounts break away during hard rollover crashes and leave the internal components undamaged. All panel mount components such as power button, LEDs, and ports are dust resistant or protected with a plug to keep out debris.

The two vision cameras are mounted on top of the compute box are Point Grey Flea3 FL3_U3_13E4C_C color cameras with a global shutter that run up to 60 Hz. Lenses are 70 degree field of view (FOV) fixed focal length. Each camera connects to the motherboard with a USB3.0 cable and is externally triggered by an Arduino Micro microcontroller with the GPIO connector. Both cameras are connected to the same trigger signal which runs at a configurable rate. Internal battery voltage and computer temperature sensors are used to monitor system health.

A modular, reconfigurable onboard computing solution uses standard consumer computer components based on the Mini-ITX form factor. Computing hardware development outpaces advancements in almost all other components so the enables upgrades and scaling as computing requirements evolve. Because the compute box utilizes a standard form factor, mounting method, and data connections, it is easy to swap and reconfigure sensing and computing payloads without mechanical modifications.

WiFi is used to monitor high bandwidth, non-time critical data from the platform such as images and diagnostic information remotely. A 900 MHz XBee Pro provides a low latency, low bandwidth wireless communication channel. The XBee receives RTK corrections at about 2 Hz, a global software run/stop signal at 5 Hz, and the position and velocity of other Robotic vehicles within communication range at 10 Hz. The RTK corrections from a stationary Hemisphere R320 GPS base station are forwarded directly into the GPS on the chassis. The base station XBee provides the software run/stop message and RTK correction messages from the base station GPS to all robots in communication range. The run/stop message allows all robots within radio range, each running its own self-contained software system, to be stopped simultaneously with one button.

The software is designed with ease of use in mind and leverages existing tools wherever possible. All computers in the system run the latest long term support (LTS) version Ubuntu Desktop to take advantage of the wide availability of pre-compiled packages and minimal configuration requirements. All software is developed using Robot Operating System (ROS). ROS is a flexible framework for writing robot software. It is a collection of tools, libraries, and conventions that aim to simplify the task of creating complex and robust robot behavior across a wide variety of robotic platforms. Custom ROS interface programs were developed for each component that lacked a publicly available interface.

Distributed system design requires robust time synchronization across all components in the system. Accurate timing is especially important as asynchronous data and control rates increase. Time synchronization is performed within the robotic system on all computing and sensing components with a combination of Ubuntu. The time source for the entire system is the GPS board on the chassis which emits National Marine Electronics Association (NMEA) 0183 messages and a pulse-pe-second (PPS) signal. The PPS signal provides a marker that is accurate to within a few nanoseconds of the start of every second according to GPS time. NMEA 0183 messages corresponding to each PPS pulse provide timing information about that pulse. NMEA 0183 and PPS signals are widely supported by devices that require time synchronization. The PPS signal is routed into GPSD running on the motherboard, the IMU, and the Arduino Micro.

GPSD is a daemon used to bridge GPS time sources with traditional time servers. GPSD runs on the compute box and receives the GPS PPS signal and NMEA messages. Processed timing information is communicated through a low latency shared memory channel to Chrony, the time server running on the computer. Compared to traditional Network Time Protocol (NTP) servers, Chrony is designed to perform well in a wide range of conditions including intermittent network connections, heavily congested networks, changing temperatures, and systems that do not run continuously. Chrony's control of system time makes time synchronization transparent to programs running on the computer. The system time of the OCS computer is synchronized to the Robotic vehicle by a second Chrony instance on the OCS Computer that communicates over WiFi with Chrony on the robot.

The IMU provides a dedicated pin for a PPS input. In addition to the PPS signal, it requires the current GPS second (GPS time is given in seconds since Jan. 6, 1980) to resolve the time of the PPS pulse. This value can be derived from the computer's system clock. The IMU uses these two pieces of information to synchronize its own clock and time stamp each measurement with an accuracy of significantly less than one millisecond to system time.

The cameras provide an external trigger interface to control when each image is captured. The Arduino Micro is used to provide the cameras with the triggering pulse at a specified frame rate. Each time a PPS pulse comes from the GPS, a train of evenly spaced pulses at the rate specified in the ROS system is sent to the cameras. The cameras images are time stamped with the system time when they are received by the computer.

The experimental embodiment employs a three layer safety system that is designed to remotely disable robot motion in the event of any software or hardware failure. The three layers include a wireless live man relay in the electronics box to disconnect the throttle signal, seamless remote switching between autonomous and manual control, and a software based run/stop. The relay and autonomous/manual modes are controlled by buttons on the RC transmitter and circumvent all autonomous controls from the compute box. In the event of a power or signal failures on the transmitter or the chassis, the live man relay automatically disconnects the throttle signal to disable motion.

A run/stop system is implemented in software by the robotic chassis interface program using incoming run/stop ROS messages to enable and disable software control of the robot. Any program in the system can publish a run/stop ROS message. The chassis interface determines whether autonomous control is enabled with a bitwise OR operation of the most recently received run/stop message from each message source. By default, the operator control station (OCS) GUI and run/stop box send/run/stop messages. The OCS run/stop message is controlled by a button in the GUI and is transmitted over WiFi from the OCS computer to the robot. The run/stop box sends a/run/stop message controlled by button state of the run/stop box over Xbee to the robot. Data transmitted over Xbee is delivered to every robot within communication range. This means that, even though there could be multiple Robotic vehicles running at the same time, each with its own self-contained ROS system, the run/stop box signal controls autonomous motion for all of the robots simultaneously. The three layer safety system allows an operator to disable motion and assume manual control of the platform without delay at any time.

The robotic vehicle chassis interface software is implemented as a ROS nodelet and communicates with the microcontroller in the chassis electronics box through a USB cable. The interface sends actuator commands to the chassis and receives chassis state information including wheel speeds, the human provided control commands read from the RC receiver, ESC diagnostic information, and safety system state information.

The throttle, steering, and front brake of the robot are controlled by 50 Hz PWM signals standard in the hobby RC community. The vehicle chassis software interface provides a calibration layer above the PWM signal for standardization across platforms and to prevent physical damage so commands do not exceed the mechanical limits in the steering and brake linkages. The chassis calibration is stored in a filed loaded at runtime by the chassis interface software. When properly calibrated, a chassis Command ROS message on any robotic platform will elicit the same behavior.

On startup, the chassis interface loads a priority list of controllers from a configuration file. The priority list is used while operating to determine which actuator commands arriving from various controllers are sent to the actuators. The priorities encode a hierarchy of controllers and define a mechanism to dynamically switch between controllers and use multiple controllers simultaneously. This experimental system allows high priority controllers to subsume control from lower 2 priority controllers as desired. Additionally, each actuator can be controlled by a separate controller such as a waypoint following controller for the steering and a separate velocity controller for the throttle and front brake.

The Operator Control Station (OCS) is a tab-based GUI built using QT that presents real time diagnostic information, debugging capabilities, and a software run/stop to a remote human operator for the robotic vehicle. Information displayed includes wheel speed data, real time images from the onboard cameras, and all diagnostic messages from the ROS/diagnostics topic which contain detailed information about the health of running nodes. Diagnostic messages are color coded by status and grouped by source for fast status recognition by the human operator. All of this data travels over a local WiFi network from the robot to the laptop running the OCS.

The OCS also provides an interface for direct control of the robot's actuators via sliders. While this interface is not appropriate for driving the car, it is used to debug software and hardware issues related to the actuators.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An autonomous vehicle research system, comprising:
   (a) a vehicle including a frame and an engine attached thereto;
   (b) a sensing, control and data logging unit mounted on the frame and in control communication with the engine, the sensing, control and data logging unit configured to: sense vehicle operational parameters, to control the engine and to steer the vehicle, to transmit operational data wirelessly and log operational data;
   (c) an operator control unit spaced apart from the vehicle, in wireless communication with the sensing, control and data logging unit, the operator control unit configured to receive operational data from the sensing, control and data logging unit and to present a visual real time display of the operational data, the operator control unit including a first manual cut-off switch that, when activated, causes the engine to cease moving the vehicle; and
   (d) a remote control unit spaced apart from the operator control unit and from the vehicle, in wireless communication with the sensing, control and data logging unit, the remote control unit manually switchable between a remote control mode and an autonomous control mode so that when a user selects the remote control mode, the user controls the vehicle remotely, and when the user selects the autonomous mode, the sensing, control and data logging unit controls the vehicle autonomously.

2. The autonomous vehicle research system of claim 1, wherein the remote control unit further comprises a second manual cut-off switch that, when activated, causes the engine to cease moving the vehicle.

3. The autonomous vehicle research system of claim 1, wherein the sensing, control and data logging unit comprises:
   (a) at least one vehicle state sensor that generates a vehicle state signal;
   (b) at least one processor that receives the vehicle state signal and that is programmed to generate control signals that control speed and direction of the vehicle;
   (c) a data logging drive that stores operational data received from the processor; and
   (d) a wireless transceiver, in communication with the processor, that receives a wireless control signal form the remote control unit and that generates a wireless operational data signal to the operator control unit.

4. The autonomous vehicle research system of claim 3, wherein the processor is further programmed to detect a predetermined unusual event and to cause the engine to cease moving the vehicle upon detection of the unusual event.

5. The autonomous vehicle research system of claim 4, wherein the engine comprises an electric motor and further comprising a battery mounted on the frame that supplies power to the electric motor.

6. The autonomous vehicle research system of claim 5, wherein the event is an event selected from a list consisting of: low battery level; loss of global positioning system signal; sensor failure; and loss of remote control signal.

7. The autonomous vehicle research system of claim 1, wherein the sensing, control and data logging unit comprises at least one sensor selected from a list consisting of: a stereo visual camera pair; a global positioning sensor; an inertial measurement unit sensor; a light detection and ranging sensor, an ultra-sound sensor, a RADAR sensor, and a wheel-mounted Hall effect wheel speed sensor.

8. The autonomous vehicle research system of claim 1, wherein the remote control unit includes:
   (a) a throttle control input;
   (b) a steering input; and
   (c) a remote/autonomous control input.

9. The autonomous vehicle research system of claim 1, wherein the vehicle is a land vehicle that includes:
   (a) a plurality of wheels that are operatively coupled to the frame and that are driven by the engine; and
   (b) a steering actuator, responsive to the a sensing, control and data logging unit, that causes two of the wheels to turn in response to control commands.

10. The autonomous vehicle research system of claim 1, further comprising a protective enclosure that protects the sensing, control and data logging unit from failure as a result of vehicle impact.

11. The autonomous vehicle research system of claim 10, wherein the protective enclosure comprises:
    (a) an exterior housing that envelops as least a portion of the sensing, control and data logging unit and that resists deformation when subjected to no more than a predetermined force;
    (b) a plurality of mounts that physically couple the exterior housing to the frame and that are configured to break away when the exterior housing is subjected to a force that is greater than the predetermined force.

12. The autonomous vehicle research system of claim 11, wherein the predetermined force comprises a 10 G force and wherein the plurality of mounts are configured to break away at a force of 8 G.

13. The autonomous vehicle research system of claim 11, wherein the exterior housing is electrically conductive so as to shield electronic components within the enclosure from electromagnetic interference.

14. The autonomous vehicle research system of claim 13, wherein the exterior housing defines at least one ventilation opening therethrough, the protective enclosure further comprising:
(a) a cooling fan that is configured to draw air through the ventilation opening; and
(b) a conductive mesh drawn across the ventilation opening and electrically coupled to the exterior housing so as to maintain electromagnetic shielding.

15. An autorally research vehicle system, comprising:
(a) a vehicle including a frame and an engine attached thereto;
(b) a sensing, control and data logging unit mounted on the frame and in control communication with the engine, the sensing, control and data logging unit configured to: sense vehicle operational parameters, to control the engine and to steer the vehicle, to transmit operational data wirelessly and log operational data;
(c) an operator control unit spaced apart from the vehicle, in wireless communication with the sensing, control and data logging unit, the operator control unit configured to receive operational data from the sensing, control and data logging unit and to present a visual real time display of the operational data, the operator control unit including a first manual cut-off switch that, when activated, causes the engine to cease moving the vehicle;
(d) a remote control unit spaced apart from the operator control unit and from the vehicle, in wireless communication with the sensing, control and data logging unit, the remote control unit manually switchable between a remote control mode and an autonomous control mode so that when a user selects the remote control mode, the user controls the vehicle remotely, and when the user selects the autonomous mode, the sensing, control and data logging unit controls the vehicle autonomously, the remote control unit including:
 (i) a throttle control input;
 (ii) a steering input;
 (iii) a user/autonomous operation control input; and
 (iv) a second manual cut-off switch that, when activated, causes the engine to cease moving the vehicle;
(e) a plurality of wheels that are operatively coupled to the frame and that are driven by the engine;
(f) a steering actuator, responsive to the a sensing, control and data logging unit, that causes two of the wheels to turn in response to control commands; and
(g) a protective enclosure that protects the sensing, control and data logging unit from failure as a result of vehicle impact, the protective enclosure including:
 (i) an exterior housing that envelops as least a portion of the sensing, control and data logging unit and that resists deformation when subjected to no more than a predetermined force; and
 (ii) a plurality of mounts that physically couple the exterior housing to the frame and that are configured to fail when the exterior housing is subjected to a force that is greater than the predetermined force.

16. The autorally research vehicle system of claim 15, wherein the sensing, control and data logging unit comprises:
(a) at least one vehicle state sensor that generates a vehicle state signal;
(b) at least one processor that receives the vehicle state signal and that is programmed to generate control signals that control speed and direction of the vehicle, wherein the processor is further programmed to detect a predetermined unusual event and to cause the engine to cease moving the vehicle upon detection of the unusual event;
(c) a data logging drive that stores operational data received from the processor; and
(d) a wireless transceiver, in communication with the processor, that receives a wireless control signal form the remote control unit and that generates a wireless operational data signal to the operator control unit.

17. The autorally research vehicle system of claim 16, wherein the engine comprises an electric motor and further comprising a battery mounted on the frame that supplies power to the electric motor.

18. The autorally research vehicle system of claim 17, wherein the event is an event selected from a list consisting of: low battery level; loss of global positioning system signal; sensor failure; and loss of remote control signal.

19. The autorally research vehicle system of claim 15, wherein the sensing, control and data logging unit comprises at least one sensor selected from a list consisting of: a stereo visual camera pair; a global positioning sensor; an inertial measurement unit sensor; a light detection and ranging sensor, an ultra-sound sensor, a RADAR sensor, and a wheel-mounted Hall effect wheel speed sensor.

20. The autorally research vehicle system of claim 15, wherein the predetermined force comprises a 10 G force and wherein the exterior housing is electrically conductive so as to shield electronic components within the enclosure from electromagnetic interference and wherein the exterior housing defines at least one ventilation opening therethrough, the protective enclosure further comprising:
(a) a cooling fan that is configured to draw air through the ventilation opening; and
(b) a conductive mesh drawn across the ventilation opening and electrically coupled to the exterior housing so as to maintain electromagnetic shielding.

* * * * *